United States Patent
Chen et al.

(10) Patent No.: US 9,854,290 B2
(45) Date of Patent: Dec. 26, 2017

(54) SYSTEM AND METHOD FOR DATA-DRIVEN AD-INSERTION IN ONLINE VIDEO STREAMS

(71) Applicant: International Business Machines Corporation, Armonk, NY (US)

(72) Inventors: Sue Ann Chen, Carlton (AU); Arun Vishwanath, Blackburn (AU); Saket Sathe, Victoria (AU); Stefan Harrer, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/953,855

(22) Filed: Nov. 30, 2015

(65) Prior Publication Data
US 2017/0155942 A1    Jun. 1, 2017

(51) Int. Cl.
*H04N 21/2668* (2011.01)
*G06F 17/00* (2006.01)
(Continued)

(52) U.S. Cl.
CPC ......... *H04N 21/2668* (2013.01); *G06F 17/00* (2013.01); *G06F 17/18* (2013.01);
(Continued)

(58) Field of Classification Search
CPC .............. G06Q 30/0272; G06Q 30/02; G06Q 30/0204; G06Q 30/0241; H04N 21/23424;
(Continued)

(56) References Cited

U.S. PATENT DOCUMENTS

| 6,698,020 B1 | 2/2004 | Zigmond et al. |
| 6,704,930 B1 | 3/2004 | Eldering et al. |

(Continued)

FOREIGN PATENT DOCUMENTS

WO   2009157903 A1   12/2009

OTHER PUBLICATIONS

Abbar, Sofiane et al. "Ranking Item Features by Mining Online User-Item Interactions", ICDE Conference 2014, pp. 460-471 (2014).*

(Continued)

*Primary Examiner* — Brian T Pendleton
*Assistant Examiner* — Krista A Contino Saumby
(74) *Attorney, Agent, or Firm* — Harrington & Smith; Louis J. Percello (57) ABSTRACT

These teachings concern smart insertion of advertisements in a video, and specifically include selecting locations in a video to place such advertisements. For a specific video there is determined an integer number k of locations for advertisements when streaming the specific video to a specific user that requests the specific video. A set of advertisements is selected to deliver with the specific video, and user feedback is utilized to determine an integer number k of discrete locations within the specific video at which to place advertisements of the set. The specific video is electronically or optically delivered to the specific user, with the set of advertisements dispersed among the k discrete locations for rendering on a local display device.

15 Claims, 10 Drawing Sheets

(51) Int. Cl.

| | |
|---|---|
| *G06F 17/18* | (2006.01) |
| *G06Q 30/02* | (2012.01) |
| *H04N 21/2343* | (2011.01) |
| *H04N 21/25* | (2011.01) |
| *H04N 21/258* | (2011.01) |
| *H04N 21/234* | (2011.01) |
| *H04N 21/81* | (2011.01) |

(52) U.S. Cl.
CPC ......... *G06Q 30/02* (2013.01); *G06Q 30/0204* (2013.01); *G06Q 30/0241* (2013.01); *H04N 21/2343* (2013.01); *H04N 21/23424* (2013.01); *H04N 21/252* (2013.01); *H04N 21/25891* (2013.01); *H04N 21/812* (2013.01)

(58) Field of Classification Search
CPC .......... H04N 21/4722; H04N 21/2343; H04N 21/252; H04N 21/25891; H04N 21/2668; H04N 21/812; G06F 17/00; G06F 17/18
See application file for complete search history.

(56) References Cited

U.S. PATENT DOCUMENTS

| | | | | |
|---|---|---|---|---|
| 7,280,974 | B2* | 10/2007 | Blanchard | G06Q 30/02 |
| | | | | 705/7.31 |
| 7,987,182 | B2* | 7/2011 | Slothouber | G06Q 30/02 |
| | | | | 707/722 |
| 8,145,528 | B2 | 3/2012 | Gilley et al. | |
| 8,418,195 | B1 | 4/2013 | Page et al. | |
| 8,434,104 | B2 | 4/2013 | Weihs et al. | |
| 8,442,384 | B2* | 5/2013 | Bronstein | G06K 9/00751 |
| | | | | 386/278 |
| 2003/0149618 | A1* | 8/2003 | Sender | G06Q 30/02 |
| | | | | 705/14.55 |
| 2004/0255322 | A1* | 12/2004 | Meadows | H04N 7/17309 |
| | | | | 725/23 |
| 2010/0228592 | A1* | 9/2010 | Anderson | G06Q 30/00 |
| | | | | 705/14.54 |
| 2011/0122968 | A1* | 5/2011 | Jongren | H04B 7/0639 |
| | | | | 375/296 |
| 2011/0249637 | A1* | 10/2011 | Hammarwall | H04B 7/0634 |
| | | | | 370/329 |
| 2011/0270649 | A1* | 11/2011 | Kerho | G06Q 30/0202 |
| | | | | 705/7.31 |
| 2012/0110620 | A1* | 5/2012 | Kilar | G06Q 30/02 |
| | | | | 725/34 |
| 2014/0258001 | A1* | 9/2014 | Ramaksrihnan | G06Q 30/0276 |
| | | | | 705/14.72 |
| 2016/0026917 | A1* | 1/2016 | Weisberg | G06N 7/005 |
| | | | | 706/46 |
| 2016/0142747 | A1* | 5/2016 | He | H04N 5/272 |
| | | | | 725/34 |

OTHER PUBLICATIONS

Karatzoglou, Alexandros, et al. "Multiverse recommendation: n-dimensional tensor factorization for context-aware collaborative filtering." Proceedings of the fourth ACM conference on Recommender systems. ACM, 2010.

Sun, Jimeng, et al., "Beyond Streams and Graphs: Dynamic Tensor Analysis", KDD'06, Aug. 20-23, 2006, pp. 374-383.

Abbar, Sofiane, et al., "Ranking Item Features by Mining Online User-Item Interactions", IEEE 2014, pp. 460-471.

* cited by examiner

SYSTEM AND METHOD FOR DATA-DRIVEN AD-INSERTION IN ONLINE VIDEO STREAMS

TECHNICAL FIELD

The exemplary embodiments of this invention relate generally to targeted on-line advertising, particularly such advertising inserted into streaming video content.

BACKGROUND

The number of companies in the online video and TV streaming space is growing rapidly. In Australia for example, the internet TV advertising industry is set to grow at a compound annual growth rate of 42% from 2011 to 2016, increasing the value from $54M to $311M. Comparing averages from a few different countries, Americans watch 17.3 hours of online video per month, Britons watch 17 hours of online video per month and Australians watch 10.2 hours of online video per month. These per-person viewing averages are also forecast to grow. Such broad and sustained growth is suitable for forward thinking video streaming companies to obtain significant revenue from advertising.

On-line advertising in streaming video has been the subject of much research in recent years. For example, U.S. Pat. No. 8,145,528 concerns inserting ads in a video stream; U.S. Pat. No. 6,698,020 utilizes an ad insertion device to insert ads at the household level, U.S. Pat. No. 6,704,930 considers an infrastructure for inserting ads in digital video streams, EP 2301250 concerns an interval-based ad insertion for the delivery of video streams and inserts ads dynamically according to the actual viewing time of the content as opposed to a fixed insertion, U.S. Pat. No. 8,418,195 concerns inserting advertising in a video-on-demand system given the viewer's identity, zip code, etc., and U.S. Pat. No. 8,434,104 schedules ads dynamically using data such as viewer statistics, geographical area, demography, age group, etc.

Certain non-patent publications use a method called tensor analysis to perform a low-rank approximation/matrix completion when there are more than two attributes; see Karatzoglou, Alexandros, et al. *Multiverse recommendation: n-dimensional tensor factorization for context-aware collaborative filtering.* [PROCEEDINGS OF THE FOURTH ACM CONFERENCE ON RECOMMENDER SYSTEMS; ACM, 2010] and Sun, Jimeng, Dacheng Tao, and Christos Faloutsos. *"Beyond streams and graphs: dynamic tensor analysis."* [PROCEEDINGS OF THE 12TH ACM SIGKDD INTERNATIONAL CONFERENCE ON KNOWLEDGE DISCOVERY AND DATA MINING; ACM, 2006]. But tensor analysis is computationally heavy and in general the trade-off with accuracy versus computational complexity is not very well-studied.

SUMMARY

In a first aspect thereof the embodiments of this invention provide an apparatus comprising one or more memories comprising computer-readable code and one or more processors. The one or more processors are configured, in response to execution of the computer-readable code, to cause the apparatus to at least:

determine for a specific video an integer number k of locations for advertisements when streaming the specific video to a specific user that requests the specific video;

select a set of advertisements to deliver with the specific video;

utilize user feedback to determine an integer number k discrete locations within the specific video at which to place advertisements of the set; and electronically or optically deliver to the specific user the specific video with the set of advertisements dispersed among the k discrete locations for rendering on a local display device.

In yet another aspect thereof the embodiments of this invention provide a computer readable memory tangibly storing computer program code embodied therewith. The program code is executable by a computing system to cause the computing system to at least:

determine for a specific video an integer number k of locations for advertisements when streaming the specific video to a specific user that requests the specific video;

select a set of advertisements to deliver with the specific video;

utilize user feedback to determine an integer number k discrete locations within the specific video at which to place advertisements of the set; and electronically or optically deliver to the specific user the specific video with the set of advertisements dispersed among the k discrete locations for rendering on a local display device.

In another aspect thereof the embodiments of this invention provide a method for selecting locations in a video to place advertisements. In this aspect the method comprises:

determining for a specific video an integer number k of locations for advertisements when streaming the specific video to a specific user that requests the specific video;

selecting a set of advertisements to deliver with the specific video;

utilizing user feedback to determine an integer number k discrete locations within the specific video at which to place advertisements of the set; and electronically or optically delivering to the specific user the specific video with the set of advertisements dispersed among the k discrete locations for rendering on a local display device.

These and other aspects of the invention are set forth below with particularity.

DETAILED DESCRIPTION

The field of inserting targeted advertisements into content provided to users over the Internet has developed quite quickly over a relatively short period of time. Generally ad targeting approaches focus on the type of ad to be shown to users; the targeting chooses which ads or which type of ads for a given user and this choice is often based on the user's demographic attributes of the user such as age, gender, etc. For the case of webpages the targeted ads are generally displayed at pre-defined locations and for the case of streaming video the targeted ads may be inserted roughly at uniform time-based positions in the video stream or alternatively at arbitrary/random intervals throughout the video stream.

Despite the rapid development in this field it appears not much attention has been paid to minimizing user annoyance when the targeted advertisement is shown. There is some user revolt over annoying advertisements as evidenced by the growth in users adopting ad-blocker software. Embodiments of these teachings stand for the proposition that ads can be inserted intelligently so as to maximize users' viewing experience of a video stream, and more particularly that ads be inserted intelligently so as to maximize users' viewing experience of a video stream that a particular user has not ever seen before.

As will be evident from the more detailed description below, embodiments of these teachings elegantly build on many of the known collaborative filtering techniques, but unlike tensor analysis techniques does so without sacrificing computational efficiency. As an overview of such embodiments FIG. 1 is a schematic drawing presenting an example system architecture for implementing these teachings and FIG. 2 is a process flow chart illustrating one particular example of a system implementation.

Figure 1:
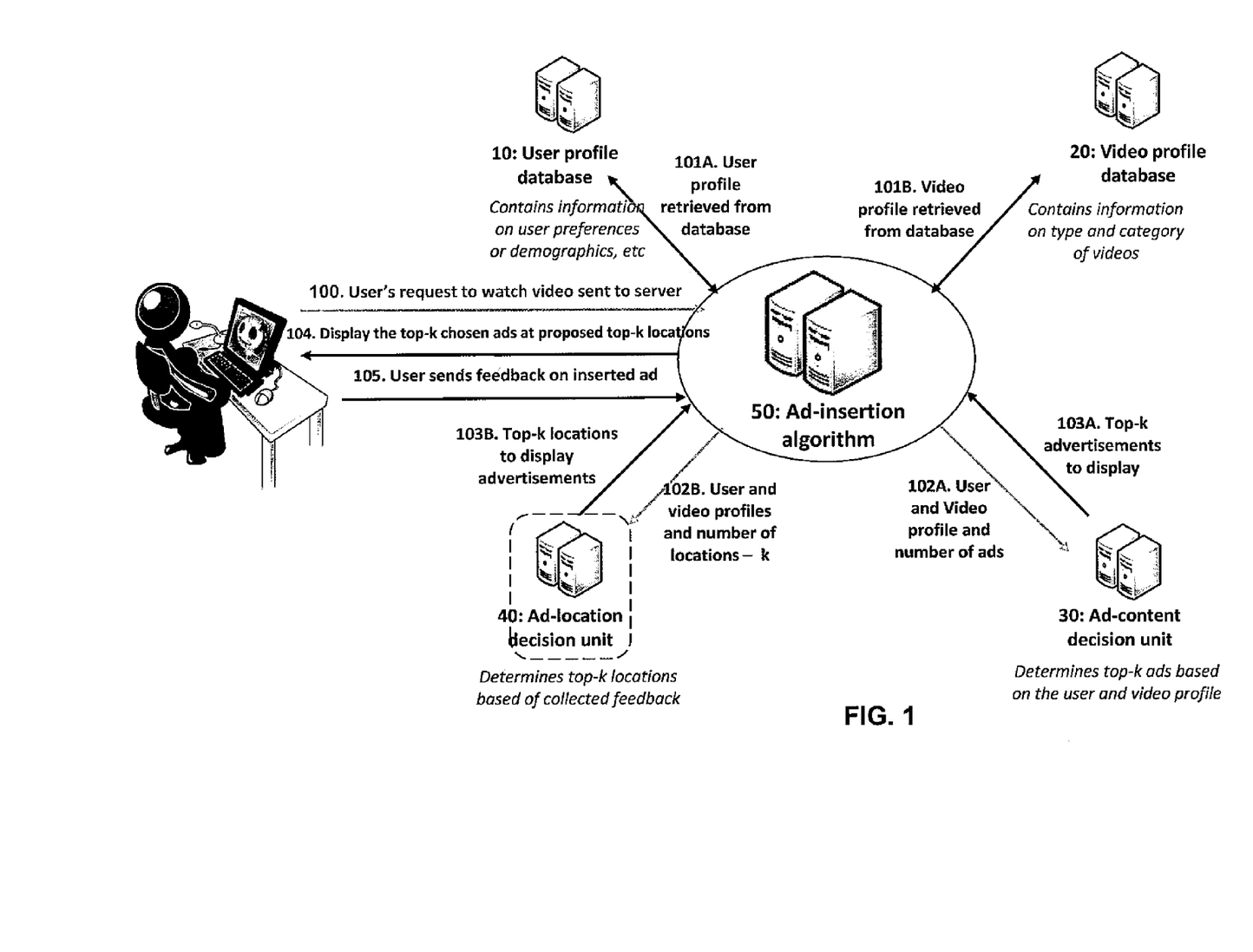
FIG. 1 is a schematic drawing presenting an example system architecture for implementing these teachings.
Figure 2:
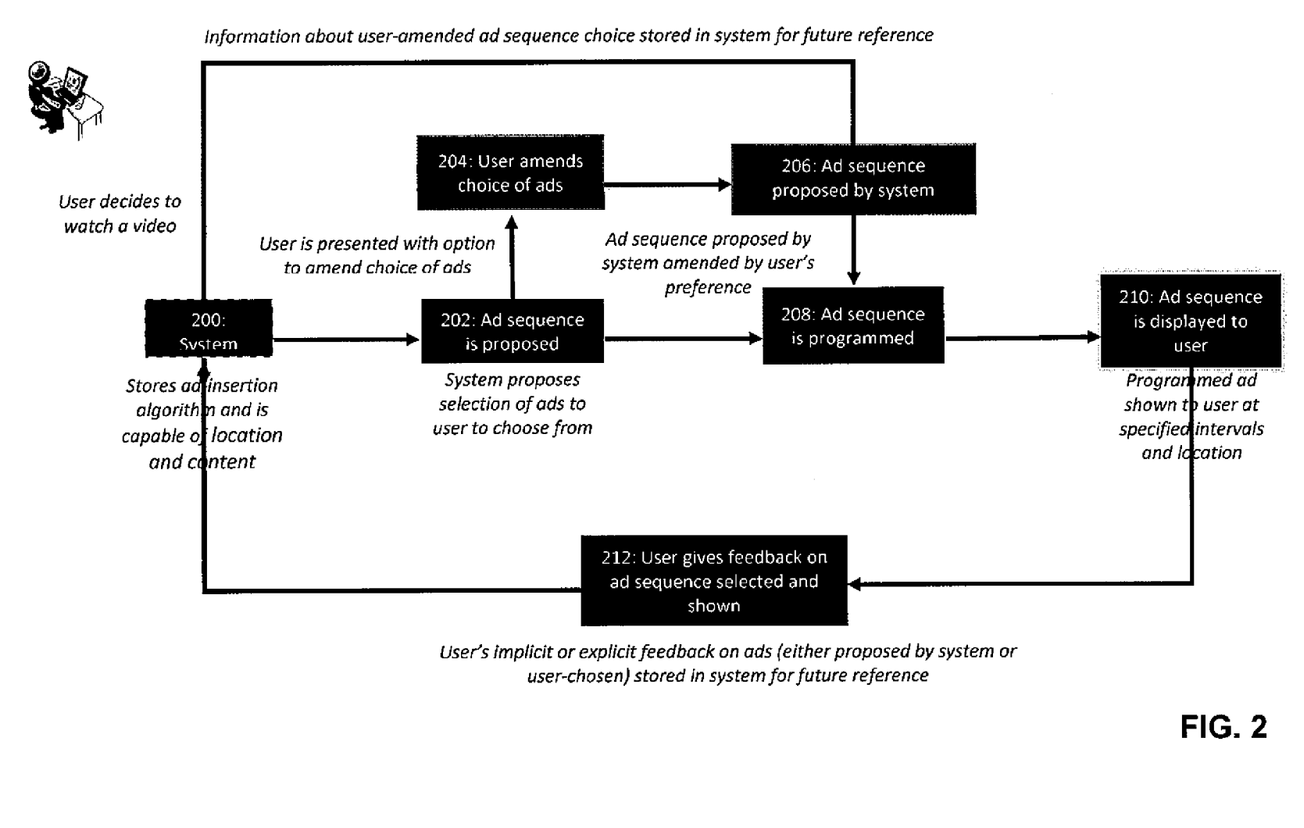
FIG. 2 is a process flow chart illustrating one particular example of a system implementation.

Beginning at FIG. 1 the user sends at 100 a request to a server at the center of FIG. 1 to watch a particular video. The server stores and runs the advertisement-insertion algorithm 50 that runs the process described herein, and the server may represent a subscription-based content provider such as Netflix®, Hulu® and the like, or it may represent user content such as that hosted by YouTube® and similar common hosting services. The various databases and decision units are shown at FIG. 1 as separate entities from the server but in practice some or all may be physically co-located with the server. In larger-scale video delivery systems it is more likely the different databases and decision units shown at FIG. 1 will be dispersed.

The user is assumed to have a user profile at a user profile database 10 containing user preferences for content and delivery, user demographics, and the like; and at least information about the requested video, if not also the requested video itself, is stored in a video profile database that contains information about the type and category of various videos that the service makes available to users. The ad insertion algorithm obtains from the user profile database 10 the profile of the user at 101A, and obtains from the video profile database 20 the specific profile for the requested video at 101B.

Given the length and/or type of video there is an integer number k of discrete advertisements that the service decides should be added when the requested video is displayed to the user. This number k may be stored as part of the video profile or the service may have an adaptive way of determining it dynamically using some user profile information, time of day or the like, but in any case the ad-insertion algorithm sends at 102A to an advertisement-content decision unit 30 the value of the number k along with the user profile and the video profile. The ad-insertion algorithm also sends at 102B this same information to an advertisement-location decision unit 40.

Based on the user profile and the video profile, the ad-content decision unit 30 chooses a number k of advertisements that best match with those profiles (the top-k ads), and at 103A returns to the ad-insertion algorithm 50 identifiers for those top-k ads or the content of those top-k ads themselves. There are quite a few techniques for making this ad-content choice known in the targeting advertisement arts so this top-k ad choice is not explored further herein.

Also based on the user profile and the video profile, the ad-location decision unit 40 chooses a number k of locations within the video stream at which to place advertisements (the top-k locations), and at 103B returns to the ad-insertion algorithm 50 indications for those top-k locations. This may be done in a variety of manners; by elapsed time of the requested streaming video when played at normal playback speed, by frame number, etc. "Within" the video stream in this case is inclusive of locations demarcating the start and end of the video, so for example if the video begins at frame 1 the frame immediately prior to frame 1 is a location within the video. While conventionally the ad locations would be equally spaced through the video or randomly chosen, in example embodiments of these teachings the top-k locations are chosen based at least in part on user preferences. FIG. 1 states this as 'collected feedback' which in some embodiments may represent feedback from only the particular user requesting the video, and in other embodiments represents feedback from multiple users having certain user profile metrics in common such as age group, gender, video viewing preferences (genre, duration, etc.) and the like. Selecting the locations based on user preferences may begin from a default or otherwise predetermined top-k locations (such as equally-spaced) which is modified over time as more user feedback is received, compiled and analyzed.

Now having the top-k advertisements from 103A and the top-k locations from 103B, the ad-insertion algorithm 50 provides to the user those top-k ads disposed within the corresponding top-k locations of the requested video. As will be shown in FIG. 2 the user may influence the ads and/or locations prior to seeing them in the requested video, but for simplicity assume they are displayed in the video as prescribed by the selections made by the ad-decision unit 30 and the ad-location unit 40. As noted above initially for a given video or for a given user the top-k selections may be made without reference to any user feedback but they may be default locations and the ads may be selected based on the limited user profile of a new subscriber or they may even be randomly selected if the user profile is too sparse at this point in time. The user provides feedback at 105 concerning the top-k ads and/or the top-k locations, which is used the next time the ad-content decision unit 30 and/or the ad-location decision unit 40 makes its respective top-k choice, for this user and a similar type/genre/length video or for other users of similar profile.

FIG. 2 has further detail of the display 104 and feedback 105 of FIG. 1 where all of FIG. 1 except the user and device at the left of FIG. 1 is assumed to be the system 200 of FIG. 2. The system 200 proposes at 202 an ad sequence for the top-k ads which in some embodiments may also include the top-k locations.

For example assume the video spans 22 minutes, k=9, the ads are grouped into threes, the 9 ad locations are within three distinct breaks of the video, and one ad is for beer to play within the first group of three ads. If the user does not like beer the user can provide feedback 105 to decline the beer ad, to which the ad-insertion algorithm 50 would obtain from the ad-content decision unit 30 a next-best match ad to present with the remaining k−1=8 ads that were previously selected that the user did not decline. If instead the user prefers fewer commercial breaks in the video s/he may provide feedback 105 to that effect, in which case the ad-insertion algorithm 50 would obtain from the ad-location decision unit 40 a new set of the k=9 locations for the ads that is selected in view of the user's preference for only one or two commercial breaks. User feedback 105 for changing both the ad choices and the ad locations can also be accommodated, and in some embodiments the user can instead change the ad-algorithm's correspondence of a selected ad to a selected location if the display at 104 of the top-k ads and top-k locations show that specific correspondence to the user. The user can accept, reject or in some embodiments also alter one or more of these top-k ads as well as the top-k locations.

In general, the system 200 at FIG. 2 selects ads and locations for inserting them in the user-selected video. At 202 the user is presented with a choice to amend the ad sequence and their locations. Any changes made by the user at 204 is learnt to better characterize the profile of the user, but in the immediate term block 206 represents the ad sequence proposed by the system 200 as amended by the user preference made at block 204, and it is this amended sequence that is programmed at block 208 into the delivery of the requested video to the user which occurs at block 210 where the ads are shown to the user as part of the video that he/she watches.

Additionally, the system 200 is capable of contextualizing physical location information of the user, for example via GPS or WiFi access point information, as well as the content information in order to present personalized ads to the user. For example, the user may be in a café and watching a video about food; the system 200 in this case can present an ad informing the user of this evening's specials at a nearby restaurant. The user's feedback at block 212 is stored for learning the user's behavior and for future reference, to be exploited later to insert ads to the user when s/he next watches a video. The user's feedback at 212 is assumed to be explicit, for example entering a specific non-binary rating (e.g., 1 through 5), entering a binary thumbs-up/thumbs-down choice, or even skipping over an ad while viewing the video stream if skipping an ad is an option for the user. But the system 200 can also obtain implicit feedback such as by learning the user's location when the request for the video is first submitted to the system 200.

FIGS. 3-8 are relevant for describing one particular but non-limiting example of how the ad decision unit 40 of FIG. 1 operates to choose the top-k locations for a given number k of ads to be placed in a video. First, assume there is online video depository accessible by users that provides access to videos corresponding to those profiled in the video profile database 20 of FIG. 1. Initially assume that while watching videos, users are shown advertisements at random locations (recognizing that as the user feedback is compiled over time these locations will no longer be random). After each advertisement at these random locations of the video the users are requested to rate on a scale of 1 to 5 how much they liked the location of the ad-insertion. For example, each rating might indicate how much a given location in the video interrupted their viewing experience. To generate this initial information users might be given monetary or other incentives to encourage reliable data from their participation. Overall this is referred to as the initial database of collected data.

Figure 3:
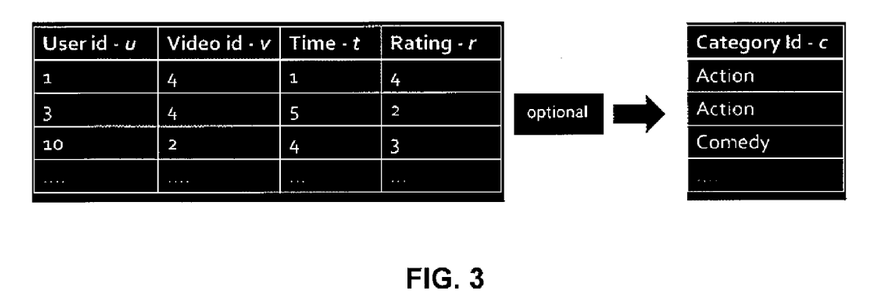
FIG. 3 is an example tabulation of data collected which is used for choosing specific locations/times at which to suggest inserting an ad into a video.

As an initial matter it is preferable to create different groups of videos based on their overall length; for example Group 1 could be all videos with length <30 mins, Group 2 could be all videos with length 30 mins to 35 mins, and to forth. In this context 'all videos' refers of course to the world of videos for which there is some ratings feedback in the initial database. Now select one of the groups of videos, use V to represent the set of videos in this selected group, and U to represent the set of users in the systems. For each group the collected data will be as shown at FIG. 3, where index u identifies a given user, index v identifies a given video, time/location t identifies a given location within a given video, and the rating r is rating by a given user of a given location for an ad in a given video. Each entry can also be tracked by the category (or genre) index c which classifies the various videos as FIG. 3 also shows. All of these indices are integers no less than zero, and the algorithm can process the different video groups iteratively or in parallel.

With this one group segment of the initial database as shown at FIG. 3, the ad decision unit 40 function of the algorithm can predict the rating of how relevant an advertisement will be for a given user u watching that advertisement occurring at time t of a video that falls into this group. The video might already be one of the set V on which some users provided specific feedback or it might be a newly added video for which there is no specific feedback. For clarity we refer to this as query 1: given user u and video v, predict the rating of how relevant will be an advertisement at time t. The solution below is merely one example of various possible implementations.

Figure 4:
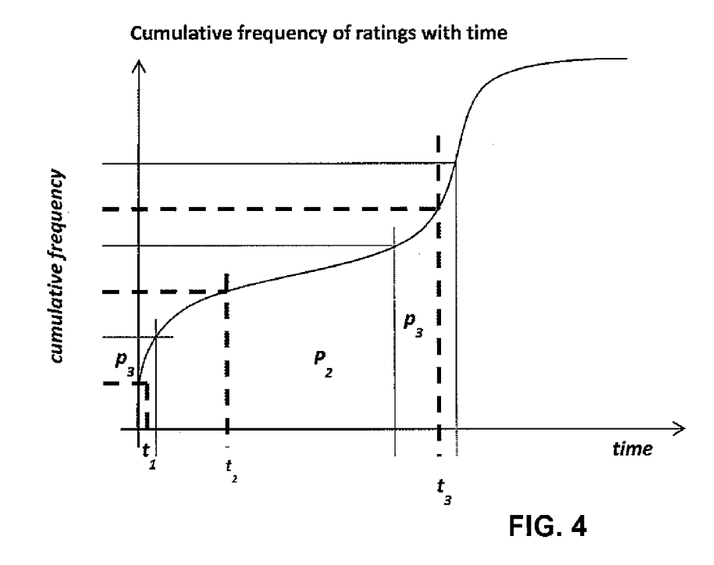
FIG. 4 Cumulative frequency of ratings with time is a data plot of user ratings as a function of location in a video for advertisements, as divided into three distinct partitions indicated by the solid lines.

To answer query 1, first split the group data into a number P of partitions (where P is an integer greater than one and the partitions are indexed as $p_1$, $p_2$, etc.), such that each partition has a similar number of ratings (equal distribution given the granularity of the rating scale). For this group of videos FIG. 4 plots the ratings as a function of time (location in the video) t on the horizontal axis and cumulative frequency of a given rating on the vertical axis; in this example there three partitions $p_1$, $p_2$ and $p_3$ separated from one another by the solid lines. The ratings to retain in each partition is computed as U*V*e, where e is a user defined fraction and U and V represent the number of users and number of videos in the respective sets. Typical values for e in FIG. 4 are 0.1. The dashed lines represent the discrete times/locations within the grouped videos and are marked in FIG. 4 as $t_1$, $t_2$ and $t_3$;

since the ads are only at those discrete times the illustrated curve in FIG. 4 represents a best fit for the three data points for this group of videos.

Figure 5:
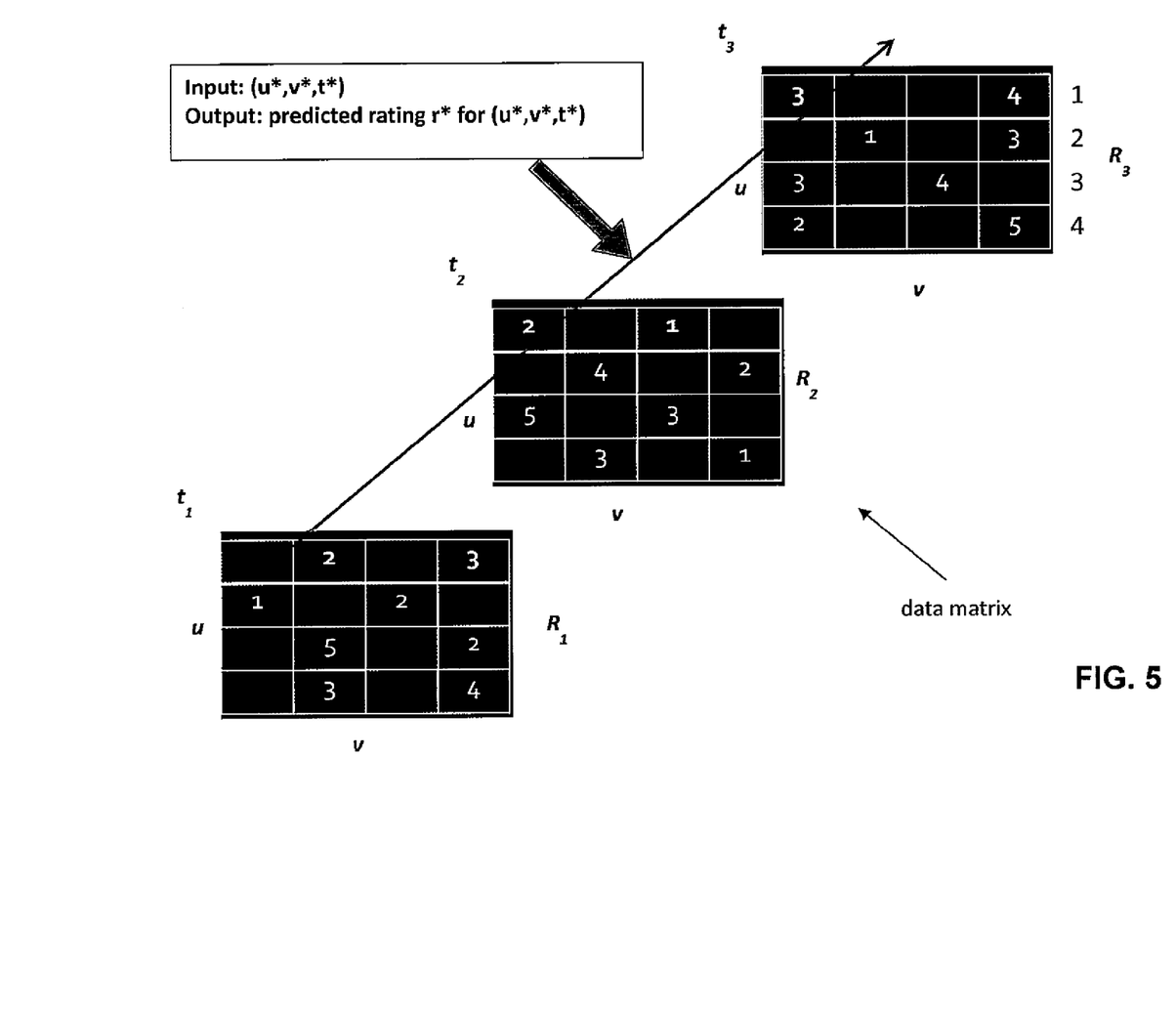
FIG. 5 illustrates the data underlying each of the partitions of FIG. 4 organized in a separate data matrix of users and videos and disposed along a timeline.

For the given video group data, each of the partitions in FIG. 4 can be represented as a data matrix ($R_1$, $R_2$ and $R_3$) of users versus videos as shown in FIG. 5, where the individual entries in the data matrix are the user ratings. The time t for query 1 can be for any arbitrary time as indicated by the large arrow in FIG. 5 which shows the individual data matrices for the time partitions $p_1$, $p_2$ and $p_3$ of FIG. 4 at the discrete time steps $t_1$, $t_2$ and $t_3$ of FIG. 4.

Figure 6:
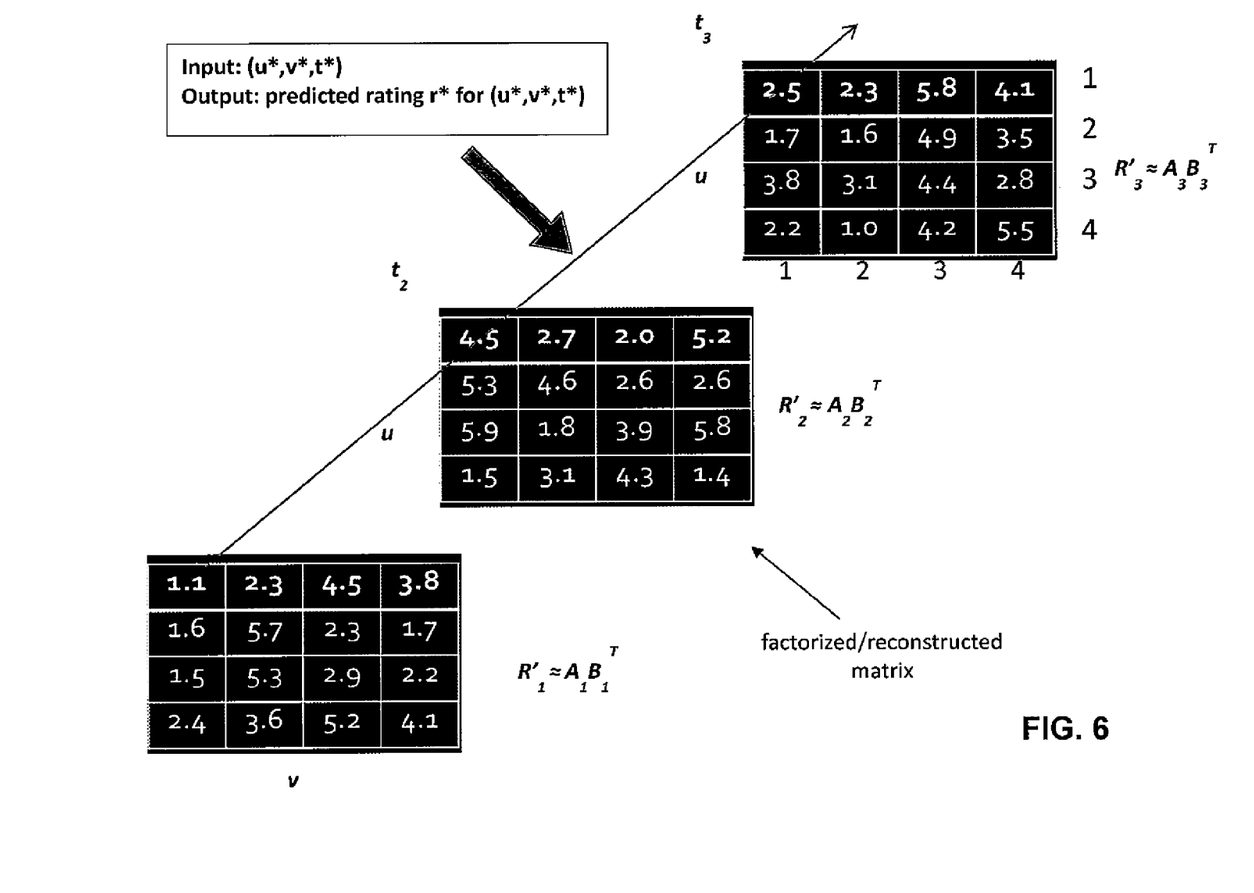
FIG. 6 Low-Rank Matrix Factorization illustrates a low-rank matrix factorization done on the data matrices from FIG. 5 to yield factorized or reconstructed matrices.
Figure 7:
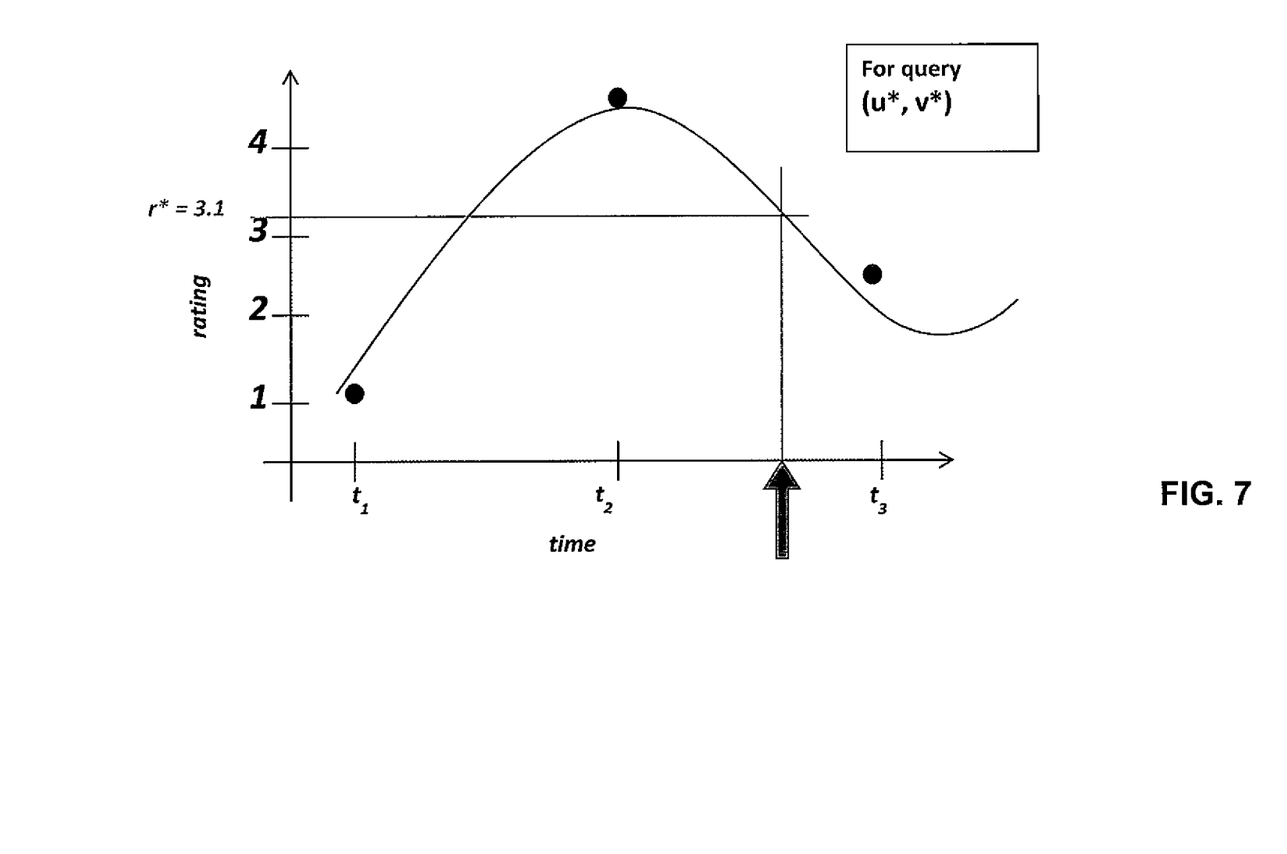
FIG. 7 Temporal Regression is a plot of temporal regression from the reconstructed matrices of FIG. 6 showing the predicted rating if an advertisement were inserted in the video at the time/location first queried at FIG. 4.

After completing the individual data matrices at each of the discrete time-steps as FIG. 5 shows; they are further refined at FIG. 6 and finally we find the rating at the specific query time t using temporal regression at FIG. 7. To better distinguish FIGS. 5 and 6, the data matrices of FIG. 5 are referred to as $R_1$, $R_2$ and $R_3$.

FIG. 6 illustrates performance of a low-rank matrix factorization on the data matrices $R_1$, $R_2$ and $R_3$ of FIG. 5 to yield factorized or reconstructed matrices $R'_1$, $R'_2$ and $R'_3$. This can be performed as follows:

Define the number of latent factors f and factorize the data matrix R in two matrices A and B;

For n users, A and B are dense matrices of size n×f; and

Approximately reconstruct the corresponding factorized matrix R' by multiplying ABT.

The reconstructed/factorized matrices R' are dense and are 2-norm approximations of the original data matrix R. In one non-limiting embodiment the Alternating Least-Squares (ALS) algorithm can be used for the above low-rank matrix factorization, or for estimating matrices A and B.

The latent factors denote hidden/shared interests/characteristics of the users, and in one embodiment these factors are learned from the data using machine learning techniques In this example these factors categorize the users according to their taste/preference on whether they liked the current ad location. From each user's affinities to the given factors (in an embodiment these affinities may also be learned using machine learning) and the ratings provided by some of the users, the ratings for all of the users can be approximated. In general this may be referred to as a matrix completion or reconstruction task.

Figure 8:
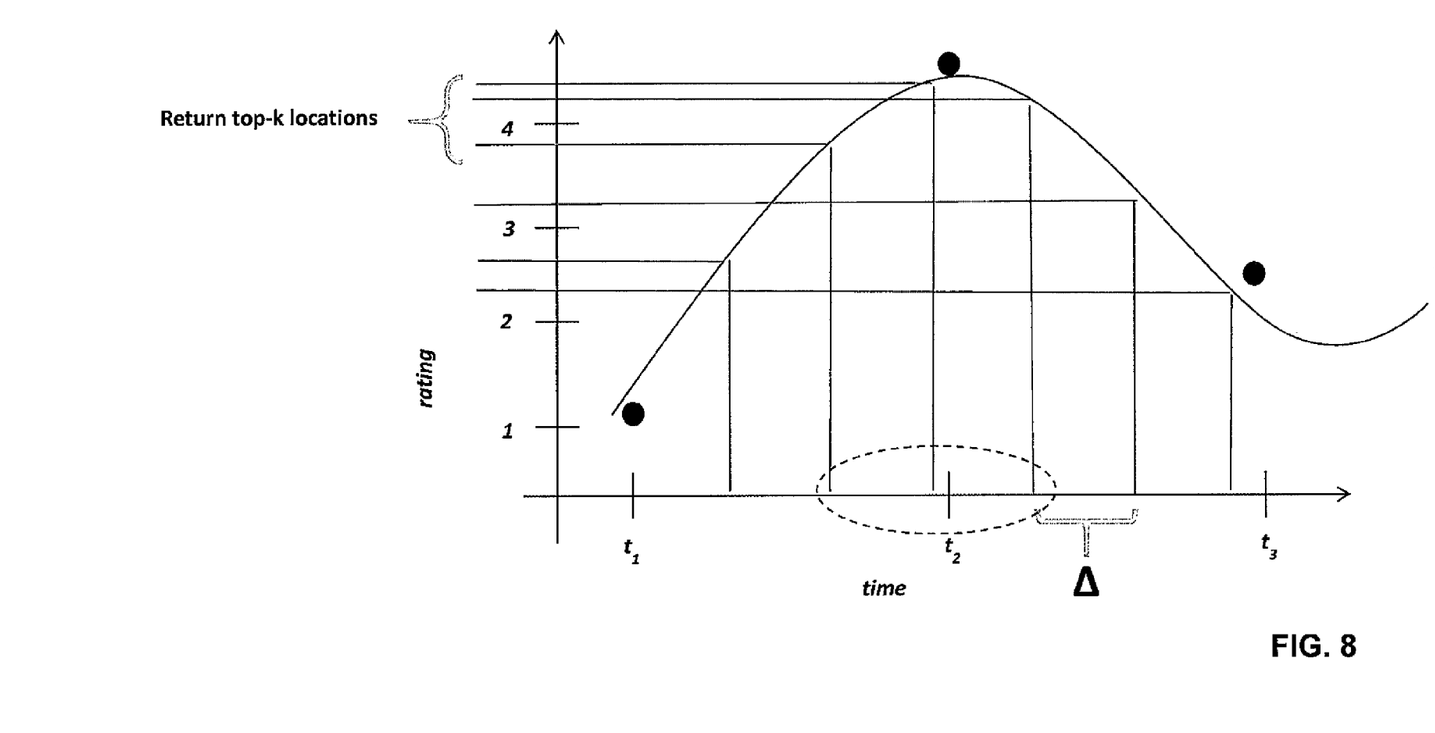
FIG. 8 Top-k Query illustrates a polynomial regression function fitted to the plotted time versus ratings as in FIG. 7 and ratings at each equal time interval to identify the top-k locations in the user requested video at which to place advertisements.

Finally, a temporal regression is performed as FIG. 7 illustrates in order to predict the rating at the arbitrary time t that was chosen at FIG. 4. This temporal regression may be performed according to the following sub-steps:

a) Select all the ratings for the queried/user-requested video (u*, v*).

b) These can be plotted in a time vs. ratings plot.

c) Fit a polynomial regression function to the points (The degree d of the polynomial regression may be defined by the video-selecting user). This is shown at FIG. 8 d) Interpolate the rating value at the query time t*.

e) Return the result.

Steps a), b), c) and parts of d) above can be done offline as preprocessing steps, and the temporal regression functions can be stored in a computer readable memory for each user-video pair, for example at either or both of the user or video databases shown at FIG. 1. This way when a new query arrives the stored temporal regression function can be simply queried to interpolate a rating for a given time.

The ad-location decision unit 40 of FIG. 1 returns the top-k locations for the advertisements, and this is query 2: Given a user u and video v, predict the top-k relevant locations for inserting an advertisement. To do this the data partitioning (FIG. 4), separating the data matrices (FIG. 5) and low-rank matrix factorization of them (FIG. 6) can be performed as detailed above for various times. In one embodiment the temporal regression for query 2 is performed differently than for query 1. Specifically, FIG. 8 illustrates materializing the temporal regression function for a given user who requested the given video. This regression is performed with a granularity Δ (shown in FIG. 8) that is preferably user-defined, for example the user's response to a query about whether they prefer 3 commercial breaks or 2 are derived from preferences in previous videos that are already in the user profile. At the left of FIG. 8 the top-k=3 locations are identified by the highest-k ratings, and in this case these top-k=3 locations to insert an ad are clustered about the discrete time $t_2$ as shown by the dashed oval.

Figure 9:
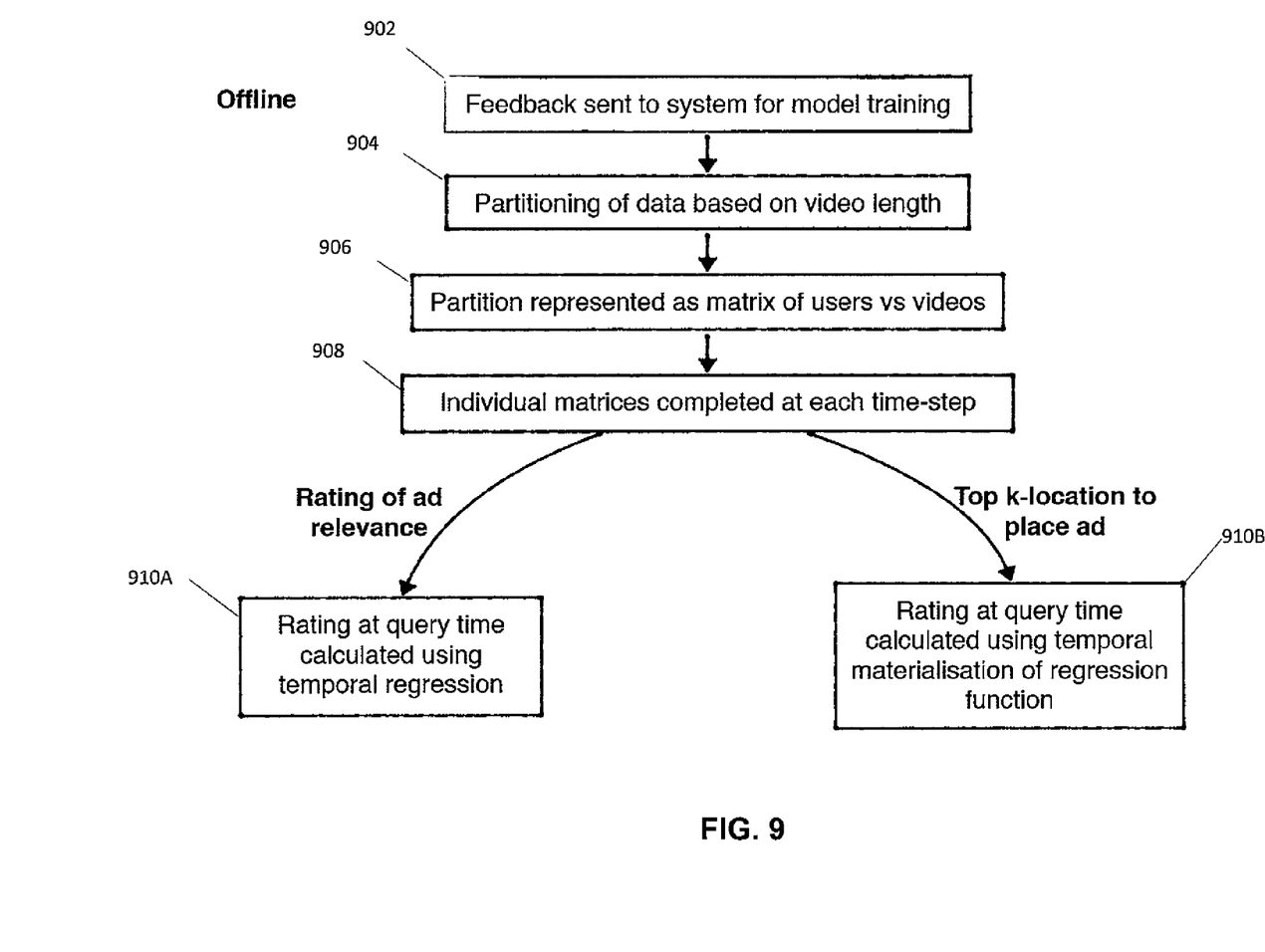
FIG. 9 is a process flow diagram showing some actions and computations that can be performed prior to having a user request for a specific video.
Figure 10:
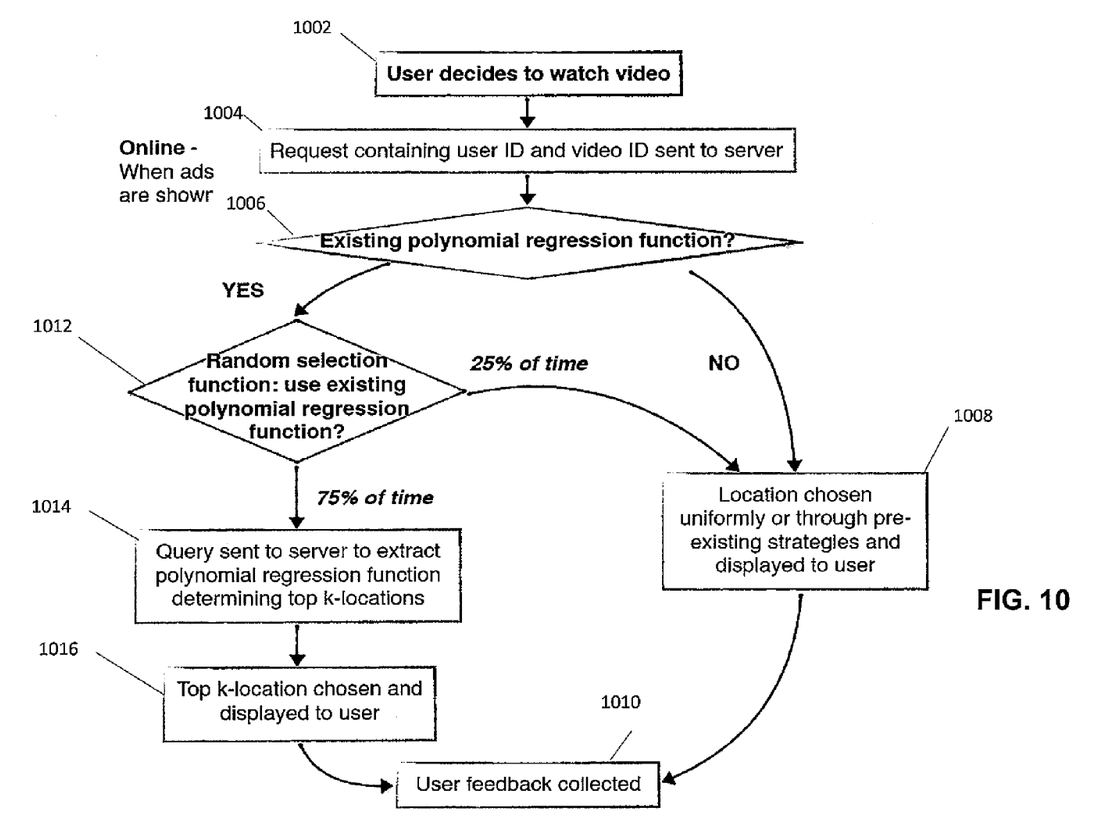
FIG. 10 is a process flow diagram showing some actions and computations that can be performed after receiving a user request for a specific video and together with FIG. 9 summarizes some aspects of these teachings.

FIG. 9 summarizes some of the above steps that can be performed offline prior to a user request for a video being received, except blocks 910A and 910B are done with reference to the user's specific request. But performing the other steps of FIG. 9 in advance of a specific user request is only for convenience and to increase speed in responding to the user request; in other embodiments all of FIG. 9 can be performed only after receiving a user's video request. FIG. 10 summarizes the steps that are performed only after receiving the user's specific request.

FIG. 9 begins with training 902 the system or algorithm using the user feedback as detailed above, where the collected data is shown at FIG. 3. Then the data for the various videos are partitioned 904 into groups according to video length as FIG. 4 illustrates and the data for the videos on the different-length groups are separated 906 and can be placed into time-specific matrices 908 as shown in FIGS. 5-6. The specific rating for a specific query time is found at 910A using temporal regression as explained with reference to FIG. 7, and the top-k locations to place an ad are shown at 910B using materialization of the regression function.

Now with the system trained per FIG. 9, at FIG. 10 a user decides to watch a video at 1002. The server that hosts/stores the ad insertion algorithm 50 gets that request at step 1004 where the request contains some identifier ID of the user and for the requested video. The ad insertion algorithm 50 first checks at 1006 to see if a polynomial regression function has been already performed for this video or for others in its group and if so it can use that stored function. If not, for example if there is insufficient feedback data to run a statistical analysis within a requisite confidence level (for example, if the requested video is very new), then FIG. 10 proceeds to 1008 in which the locations for the ads are chosen to be uniformly distributed or some other known ad distribution technique.

The system first determines if there is an existing polynomial regression function at block 1006, and if there exists a polynomial regression function then the random selection function at block 1012 allows the system to override this knowledge (of an existing function) so that the system behaves like there is no existing regression function. The inventors estimate this might occur approximately 25% of the time in which case the FIG. 10 flow again goes to block 1008 where some previously known method is used to distribute the ads among the requested video. For the remaining instances which is expected to be a strong majority, the query (query 2 above) is sent to the server and the algorithm is run to extract the polynomial regression function from which is determined the top-k locations to insert the advertisements, which are chosen and displayed to the user at those locations of the video at block 1016. The feedback 1010 is similar as described for block 212 of FIG. 2.

Figure 11:
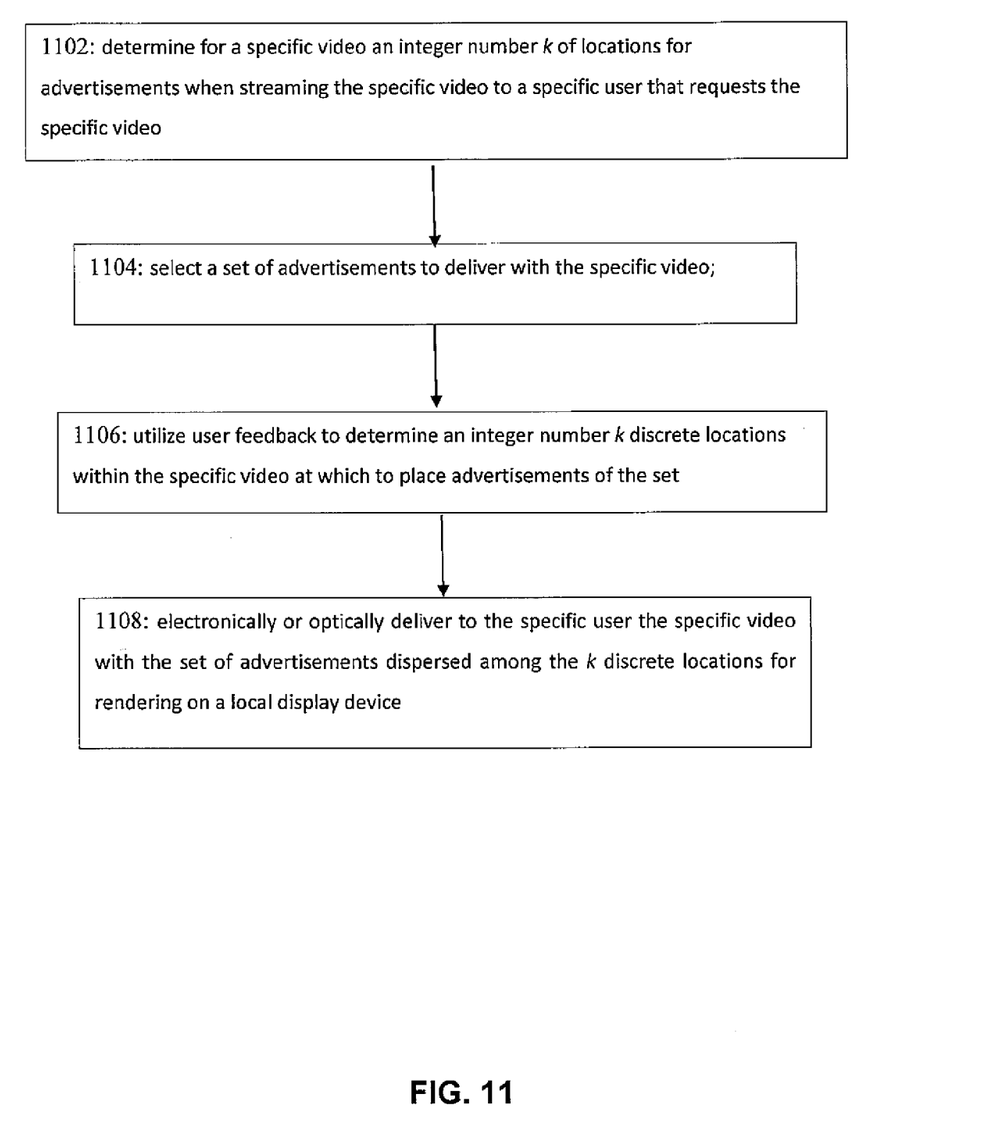
FIG. 11 is a logic flow diagram illustrating a method that encompasses certain features of the embodiments of this invention.

FIG. 11 is a process flow diagram summarizing some of the above aspects of these teachings for selecting locations in a video to place advertisements. FIG. 11 may represent a method, or actions performed when a computer program/program code tangibly stored on a computer readable memory is executed, or functions performed by a server on which is stored an algorithm according to these teachings. FIG. 11 may be implemented by an apparatus such as a computing system that includes one or more memories comprising computer-readable code and one or more processors, wherein the one or more processors are configured, in response to execution of the computer-readable code, to cause the computing system or apparatus to perform the actions shown.

At block 1102 there is determined for a specific video an integer number k of locations for advertisements when streaming the specific video to a specific user that requests the specific video. This is where the value of k is determined, as opposed to the specific locations. Then block 1104 selects a set of advertisements to deliver with the specific video. The set may have k different advertisements, or there may be more than k advertisements if at one or more of the eventually k locations two or more ads are shown sequentially. Or the set can even have less than k different advertisements, for example if the same advertisement is repeated two or more times when streaming the specific video.

User feedback is used at block 1106 to determine an integer number k discrete locations within the specific video at which to place advertisements of the set, and then at block 1108 it is electronically or optically delivering to the specific user along with the set of advertisements that are dispersed among the k discrete locations. This delivery is for rendering on a display device that is local to the user, such as a mobile phone, a tablet or laptop computer, a wearable computer such as an eyeglass-mounted computer having a video screen projected in front of the retina or that projects directly on the retina.

In one particular non-limiting embodiment, utilizing the user feedback in block 1106 includes storing a database indicating user preferences for various locations in videos for placing advertisements as shown with respect to FIG. 1; and selecting from the database only those user preferences for a group of videos having a duration within a predetermined range that matches a duration of the selected video as described with reference to FIG. 4.

Further as detailed above for FIG. 4, the user preferences for the group of videos had ratings for each of multiple time-step locations t, and utilizing the user feedback at block 1106 of FIG. 11 included: a) partitioning data in the database for the group of videos into an integer number P partitions such that each partition has a similar number of ratings and b) for each of the time-step locations t, forming a matrix R of the corresponding ratings as in FIG. 4. Then as described with reference to FIGS. 7-8, c) a line was statistically fit joining the time-step locations t with the matrices R, d) the k highest ratings were extracting from the line, each highest rating spaced in time from one another by a minimum granularity $\Delta$, and e) the k discrete locations were determined as the locations associated by the line with the k highest ratings.

This statistically fitting of the line joining the time-step locations t with the matrices R was described with more specificity above, namely at FIG. 6 the matrices R were factorized with a group of latent factors f to yield submatrices A and B and matrices R' were approximately constructed from the submatrices A and B; and a user rating was predicted for a queried location (queried time) from the approximately constructing matrices R'.

Another way to utilize the user feedback to determine the k discrete locations per block 1106 was detailed with reference to FIG. 8 where a stored database indicates user ratings for various time-step locations in videos for placing advertisements; from the database is selected only those user ratings from the specific user for a group of videos having a duration within a predetermined range that matches a duration of the selected video, and a polynomial regression function was fit to the selected user ratings and corresponding time-step locations. More specifically, the k highest ratings were extracted from a materialized polynomial regression function where each highest rating was spaced in time from one another by a minimum granularity $\Delta$; and the k discrete locations were selected as those locations associated by the materialized polynomial regression function with the k highest ratings.

FIG. 2 also detailed at blocks 202/204 and/or 212 that after receiving from the specific user's request for the specific video, feedback can be obtained from the user concerning advertisements at the k discrete locations and this feedback can be stored in the database also. Blocks 202/204 are more specifically directed to the case where, prior to the electronic or optical delivery at block 1108 of FIG. 11, feedback from the specific user can be solicited for a proposed set of advertisements and/or a proposed set of k locations for advertisements; and this feedback received in reply to the soliciting can be used to select the set of advertisements to deliver with the specific video and/or for determining the k discrete locations.

The aspects of the invention summarized above with respect to FIG. 11 may be embodied as an apparatus comprising one or more memories tangibly storing computer-readable code and one or more processors. In this case the one or more processors are configured, in response to execution of the computer-readable code, to cause the apparatus to perform actions detailed above with respect to FIG. 11. The server shown at FIG. 1 associated with the ad insertion algorithm 50 is one example of such an apparatus.

Computer readable memories in a server or other host computing apparatus are well known. Some non-limiting examples of such known computer readable memories include an electronic storage device, a magnetic storage device, an optical storage device, an electromagnetic storage device, a semiconductor storage device, or any suitable combination of the foregoing; and more specifically a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions or computer-readable code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions/ computer-readable code may execute entirely on one computer/server, or partially on multiple computers/servers communicating with one another over one or more networks such as a local area network (LAN) or a wide area network (WAN), or through the Internet for example. In some embodiments, electronic circuitry including, for example, programmable logic circuitry, field-programmable gate arrays (FPGA), or programmable logic arrays (PLA) may execute the computer readable program instructions/computer-readable code.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions/computer-readable code.

These computer readable program instructions/computer-readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A method for selecting locations in a video to place advertisements, the method comprising:

determining for a specific video an integer number k of locations for advertisements when streaming the specific video to a specific user that requests the specific video;

selecting a set of advertisements to deliver with the specific video;

utilizing user feedback to determine an integer number k discrete locations within the specific video at which to place advertisements of the set; and electronically or optically delivering to the specific user the specific video with the set of advertisements dispersed among the k discrete locations for rendering on a local display device;

wherein utilizing the user feedback to determine the k discrete locations comprises:

storing a database indicating user preferences for various locations in videos for placing advertisements; and selecting from the database only those user preferences for a group of videos having a duration within a predetermined range that matches a duration of the selected video;

and wherein the user preferences for the group of videos comprises a rating for each of multiple time-step locations t, and utilizing the user feedback to determine the k discrete locations further comprises:

partitioning data in the database for the group of videos into an integer number P partitions such that each partition has a similar number of ratings;

for each of the time-step locations t, forming a matrix R of the corresponding ratings;

statistically fitting a line joining the time-step locations t with the matrices R;

extracting from the line the k highest ratings, each highest rating spaced in time from one another by a minimum granularity; and determining the k discrete locations as the locations associated by the line with the k highest ratings.

2. The method according to claim 1, wherein statistically fitting the line joining the time-step locations t with the matrices R comprises:
factorizing the matrices R with a group of latent factors f to yield submatrices A and B;
approximately constructing matrices R' from submatrices A and B; and
predict a user rating for a queried location from the approximately constructing matrices R'.

3. The method according to claim 1, wherein utilizing user feedback to determine the k discrete locations comprises:
storing in the database indicating user ratings for various time-step locations in videos for placing advertisements;
selecting from the database indicating the user ratings only those user ratings from the specific user for a group of videos having a duration within a predetermined range that matches a duration of the selected video; and
fitting a polynomial regression function to the selected user ratings and corresponding time-step locations.

4. The method according to claim 3, wherein the k discrete locations are determined by:
materializing the polynomial regression function and extracting therefrom the k highest ratings, each highest rating spaced in time from one another by a minimum granularity; and
selecting the k discrete locations as the locations associated with the k highest ratings by the materialized polynomial regression function.

5. The method according to claim 3, further comprising:
after receiving the specific user's request for the specific video, obtaining feedback from the user concerning advertisements at the k discrete locations and storing said feedback in the database.

6. The method according to claim 1, further comprising:
prior to electronically or optically delivering to the specific user the specific video, soliciting feedback from the specific user for a proposed set of advertisements and/or a proposed set of k locations for advertisements; and
utilizing feedback received in reply to the soliciting for selecting the set of advertisements to deliver with the specific video and/or for determining the k discrete locations.

7. An apparatus comprising:
one or more memories comprising computer-readable code, and one or more processors;
wherein the one or more processors are configured, in response to execution of the computer-readable code, to cause the apparatus to at least:
determine for a specific video an integer number k of locations for advertisements when streaming the specific video to a specific user that requests the specific video;
select a set of advertisements to deliver with the specific video;
utilize user feedback to determine an integer number k discrete locations within the specific video at which to place advertisements of the set; and
electronically or optically deliver to the specific user the specific video with the set of advertisements dispersed among the k discrete locations for rendering on a local display device;
wherein utilizing the user feedback to determine the k discrete locations comprises:
storing a database indicating user preferences for various locations in videos for placing advertisements; and
selecting from the database only those user preferences for a group of videos having a duration within a predetermined range that matches a duration of the selected video;
and wherein the user preferences for the group of videos comprises a rating for each of multiple time-step locations t, and utilizing the user feedback to determine the k discrete locations further comprises:
partitioning data in the database for the group of videos into an integer number P partitions such that each partition has a similar number of ratings;
for each of the time-step locations t, forming a matrix R of the corresponding ratings;
statistically fitting a line joining the time-step locations t with the matrices R;
extracting from the line the k highest ratings, each highest rating spaced in time from one another by a minimum granularty; and
determining the k discrete locations as the locations associated by the line with the k highest ratings.

8. The apparatus according to claim 7, wherein statistically fitting the line joining the time-step locations t with the matrices R comprises:
factorizing the matrices R with a group of latent factors f to yield submatrices A and B;
approximately constructing matrices R' from submatrices A and B; and
predict a user rating for a queried location from the approximately constructing matrices R'.

9. The method according to claim 7, wherein utilizing user feedback to determine the k discrete locations comprises:
storing in the database indicating user ratings for various time-step locations in videos for placing advertisements;
selecting from the database indicating the user ratings only those user ratings from the specific user for a group of videos having a duration within a predetermined range that matches a duration of the selected video; and
fitting a polynomial regression function to the selected user ratings and corresponding time-step locations.

10. The apparatus according to claim 9, wherein the k discrete locations are determined by:
materializing the polynomial regression function and extracting therefrom the k highest ratings, each highest rating spaced in time from one another by a minimum granularity; and
selecting the k discrete locations as the locations associated with the k highest ratings by the materialized polynomial regression function.

11. The apparatus according to claim 9, wherein the one or more processors are configured in response to execution of the computer-readable code to cause the apparatus further to at least:
after receiving the specific user's request for the specific video, obtain feedback from the user concerning advertisements at the k discrete locations and storing said feedback in the database.

12. The apparatus according to claim 7, wherein the one or more processors are configured in response to execution of the computer-readable code to cause the apparatus further to at least:

prior to electronically or optically delivering to the specific user the specific video, solicit feedback from the specific user for a proposed set of advertisements and/or a proposed set of k locations for advertisements; and utilize feedback received in reply to the soliciting to select the set of advertisements to deliver with the specific video and/or for determining the k discrete locations.

13. A non-transitory computer readable memory tangibly storing program code which, when executed by a computing system, causes the computing system to at least:

determine for a specific video an integer number k of locations for advertisements when streaming the specific video to a specific user that requests the specific video;

select a set of advertisements to deliver with the specific video;

utilize user feedback to determine an integer number k discrete locations within the specific video at which to place advertisements of the set; and electronically or optically deliver to the specific user the specific video with the set of advertisements dispersed among the k discrete locations for rendering on a local display device;

wherein utilizing the user feedback to determine the k discrete locations comprises:

storing a database indicating user preferences for various locations in videos for placing advertisements; and selecting from the database only those user preferences for a group of videos having a duration within a predetermined range that matches a duration of the selected video;

and wherein the user preferences for the group of videos comprises a rating for each of multiple time-step locations t, and utilizing the user feedback to determine the k discrete locations further comprises:

partitioning data in the database for the group of videos into an integer number P partitions such that each partition has a similar number of ratings;

for each of the time-step locations t, forming a matrix R of the corresponding ratings;

statistically fitting a line joining the time-step locations t with the matrices R;

extracting from the line the k highest ratings, each highest rating spaced in time from one another by a minimum granularity; and determining the k discrete locations as the locations associated by the line with the k highest ratings.

14. The non-transitory computer readable memory according to claim 13, wherein utilizing user feedback to determine the k discrete locations comprises:

storing in the database indicating user ratings for various time-step locations in videos for placing advertisements;

selecting from the user ratings database indicating the user ratings only those user ratings from the specific user for a group of videos having a duration within a predetermined range that matches a duration of the selected video; and fitting a polynomial regression function to the selected user ratings and corresponding time-step locations.

15. The non-transitory computer readable memory according to claim 13, wherein the executed program code further causes the computing system to:

prior to electronically or optically delivering to the specific user the specific video, solicit feedback from the specific user for a proposed set of advertisements and/or a proposed set of k locations for advertisements; and utilize feedback received in reply to the soliciting to select the set of advertisements to deliver with the specific video and/or for determining the k discrete locations.

* * * * *